United States Patent [19]
Otto

[11] 3,806,081
[45] Apr. 23, 1974

[54] ONE-SHOT PILOT OPERATED VALVE

[75] Inventor: Noel A. Otto, Whippany, N.J.

[73] Assignee: Automatic Switch Company, Florham Park, N.J.

[22] Filed: Oct. 6, 1972

[21] Appl. No.: 295,767

[52] U.S. Cl. .................. 251/22, 251/45, 251/28
[51] Int. Cl. .................................... F16k 31/385
[58] Field of Search ............ 251/22, 46, 45, 28, 29

[56] References Cited
UNITED STATES PATENTS
2,387,225  10/1945  Beekley .............................. 251/45
2,610,819  9/1952  Sutton ............................... 251/28 X FOREIGN PATENTS OR APPLICATIONS
20,500  0/1903  Great Britain ....................... 251/22

Primary Examiner—Arnold Rosenthal
Attorney, Agent, or Firm—Alan H. Levine

[57] ABSTRACT

A valve including an inlet port, an outlet port, and a controlled main valve member which allows or prevents the flow of air from the inlet port to the outlet port. Within the valve, high pressure air to the valve inlet port is coupled via a hole in a diaphragm to a main chamber. The high pressure in the main chamber causes the main valve member to be seated, thereby blocking the passage of the high pressure air to the outlet port. A pilot valve, within the valve, when actuated by an operator, e.g., a piston, opens and connects the main chamber to a pulse chamber having a lower air pressure. As a result, air from the main chamber flows into the pulse chamber, and the pressure in the main chamber drops. The main valve member is thereby unseated, and high pressure air flows from the inlet port to the outlet port. As time passes, the high pressure air, via the hole in the diaphragm, builds the pressure up in the pulse chamber and hence in the main chamber, thereby causing the main valve to be seated and terminating the flow of air from the inlet port to the outlet port. The piston is actuated to open the pilot valve by a control signal applied to a signal port. When the control signal is removed from the signal port, a spring in the main chamber closes the pilot valve and a bore connecting the pulse chamber to the piston cylinder permits the pressure in the pulse chamber to drop. Alternatively, the pulse chamber may be continuously vented to the atmosphere through a restricted opening. Thereafter, the valve is ready for another cycle of operation.

9 Claims, 4 Drawing Figures

ONE-SHOT PILOT OPERATED VALVE

This invention relates to pilot operated valve, and especially to pneumatic valves adapted to provide a single blast of air each time the pilot is actuated. However, it is to be understood that the valve has utility with fluids generally.

It is a general object of the invention to provide a pilot operated valve which responds to an actuating control signal for opening the valve only once for each application of the pressure signal to a pilot valve, regardless of how long the pressure signal remains applied to the pilot valve.

It is another object of the present invention to provide a valve which must be closed for a predetermined period of time before the valve will be open in response to an applied control signal.

It is still another object of the present invention to provide a valve which is capable of supplying a fixed output pressure pulse each time its pilot valve is opened for at least a predetermined time interval.

A practical application of the subject valve is in apparatus for shaking air filter bags of dust collector equipment. Such bags require a large volume, rapidly applied, blast of air to effectively shake loose the dust adhering to them. In the past, filter bag shaking apparatus has required a relatively complex and expensive arrangement of individual valves and pneumatic circuit connections to shake the bags. The valve of the present invention makes it possible to assemble a much simpler arrangement in which the subject valve supplies a short duration pulse required to operate the pneumatic valves of the shaking apparatus while eliminating the need for the expensive electrical and pneumatic timers currently in use.

The present valve is useful not only as a part of a filter bag shaking apparatus, but in any situation requiring a fixed output pressure pulse each time a control signal is applied, regardless of the length of time that the control signal remains applied, and in fact in any situation requiring a valve which responds once each time a control signal is applied.

Additional features and advantages of the invention will be apparent from the following description in which reference is made to the accompanying drawings.

Figure 1:
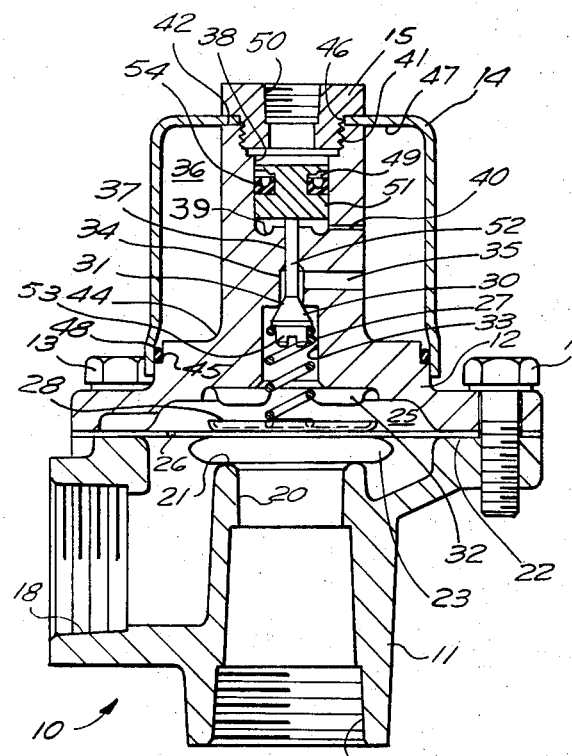
FIG. 1 is a longitudinal cross-sectional view of a pneumatic valve, according to the invention, showing the main and pilot valves closed.

The valve 10 chosen to illustrate this invention includes a valve body comprising main sections 11 and 12 fastened together by bolts 13; and auxiliary sections 14 and 15 stacked upon, and secured to, body section 12 by a threaded engagement between the auxiliary section 15 and main section 12.

Body section 11 is formed with an inlet port 18, an outlet port 19, both adapted for connection to conduits, an orifice 20 between the two ports, and a valve seat 21 surrounding the orifice. A main diaphragm 22, formed of a suitable flexible and resilient material such as rubber, extends above the orifice 20, the margin of the diaphragm being sandwiched between the body sections 11 and 12. A main valve member 23 carried by the diaphragm 22 is movable into and out of engagement with the valve seat 21 to close and open the main valve, respectively.

Above diaphragm 22 is a main chamber 25 communicating with inlet port 18 via a small hole 26 in diaphragm 22. Within chamber 25 is a compression spring 27 seated at its lower end upon a pressure distributing member 28 and at its upper end as more fully described below, against a pilot valve member 30. Spring 27 biases the pilot valve member 30 against a pilot valve seat 31. Pressure distributing member 28 is located against the diaphragm in the area above the main valve member 23. Thus, when chamber 25 is filled with fluid at the inlet pressure, the fluid force against the upper face of diaphragm 22 combined with the force of spring 27 keeps the valve member 23 upon seat 21 and closes the main valve, as shown in FIG. 1. If the pressure in chamber 25 is relieved, the inlet pressure acting on the lower face of diaphragm 22 lifts the diaphragm and the main valve member 23 (see FIG. 2). The main valve remains open as long as the pressure in chamber 25 remains relatively low.

The pressure in chamber 25 is controlled by a pilot valve structured as follows. Chamber 25 includes a large bore 33 extending upwardly from the top wall 32 of the chamber, and a smaller bore 34 extends upwardly from the top wall of bore 33, the edge common to bores 33 and 34 defining the valve seat 31. A lateral bore 35 extends between bore 34, at a point above seat 31, and a pulse chamber 36, more fully described below. In addition, a bore 37 extends upwardly from bore 34 into communication with a piston cylinder 38. The bottom portion of the piston cylinder 38 includes a semi-circular annular groove 39 which communicates, via a lateral bore 40, with the pulse chamber 36, and the top part of piston cylinder 38 extends into the base of a tapped hole 41.

The tapped hole 41 extends downwardly from the top surface 42 of main section 12 and is concentric with an axis common to the piston cylinder 38 and bores 33, 34 and 37. From the top surface 42 downwardly to an imaginary plane passing perpendicularly through the bore 33 the main section 12 is cylindrical. Thereafter, the cylindrical surface flares out along a fillet 44 and a step 45. Step 45 serves to support an O-ring seal 48 used to provide an air tight seal between the main section 12 and auxiliary section 14.

Auxiliary section 14 resembles an inverted cup having a flared lip and a hole 46 in its base 47 which is slightly larger than the tapped hole 41. When the auxiliary section 14 is coupled to the main section 12, the hole 46 is concentric with the tapped hole 41, a section of the base abuts the top surface 42, and the lip compresses the O-ring seal 48. This arrangement is secured by auxiliary member 15. Auxiliary member 15 includes a threaded portion engageable with the tapped hole 41 and a flange for pressing the base 47 against the top surface 42, thereby providing another air-tight seal between the auxiliary section 14 and the main section 12. The annular space within the auxiliary member 14 and surrounding the cylindrical surface of the main section 12 defines the pulse chamber 36 previously referred to.

Auxiliary member 15 also includes an internally threaded hole 50 adapted to be engaged by a conduit (not shown) for transmitting a pneumatic control signal to the piston cylinder 38. Piston cylinder 38 slidably supports a piston 51 which is connected by a stem 52, slidably passing through bore 37, to the pilot valve member 30. Valve member 30 resembles a truncated cone having a boss 53 extending downwardly from its base. Boss 53 serves to accommodate and couple an end of the compression spring 27 to the valve member 30, as previously mentioned. Stem 52 is of such length that when the piston 51 is in its uppermost position in the piston chamber 38 (see FIG. 1) the pilot valve member is seated, and when the piston is moved into its lowermost position in the piston cylinder (see FIG. 2), by a control signal, the main pilot valve member 30 is unseated. In the unseated position, as more fully described below, pressurized air is permitted to flow from the main chamber 25 into the pulse chamber 36 via bores 33, 34, 35.

Piston 51 includes an annular groove 49 along its cylindrical wall which serves as a seat for a U-cup seal 54, i.e., an annular member having a U-shaped cross-section. The edges of the U-cup seal point upwardly and its outside upper edge slidably abuts the wall of cylinder 38. Thus, air is permitted to flow upwardly past the piston 51 but not downwardly. Accordingly, when the pressure in the pulse chamber 36 exceeds the pressure within the hole 50, the air in the pulse chamber vents through the bore 40 and piston cylinder 38, thereby reducing the pressure in the pulse chamber 36.

Referring to FIG. 1, if no fluid is applied in the valve, spring 27 biases the pilot valve member 30 and main valve member 23 into their seated positions and the air pressure in the chambers and ports of the assembly is relatively low. To operate the valve, a high pressure fluid source (not shown) is applied to the inlet port 18. The high pressure fluid passes through the hole 26 into the main chamber 25 and bore 33 until the pressure differential between both sides of the hole 26 is substantially zero. Since the area subject to inlet pressure is larger on the upper side of the diaphragm 22 than on its lower side, the fluid pressure causes a greater downward force to be exerted upon the main valve 23, thereby preventing flow of fluid from the inlet port 18 to the outlet port 19.

Figure 2:
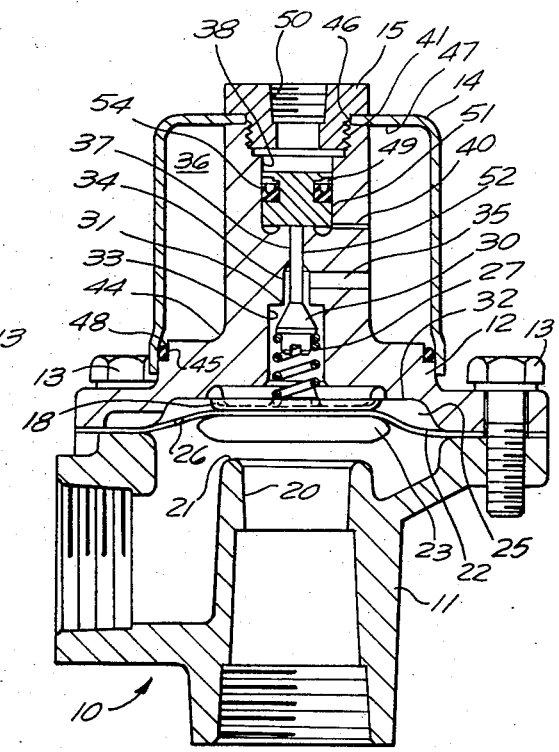
FIG. 2 is a longitudinal cross-sectional view of the pneumatic valve showing the main valve and the pilot valve open.

If, after the high pressure fluid source is connected to the valve, a fluid pressure control signal is applied, via hole 50, to the piston cylinder, the piston is caused to move downwardly and the pilot valve member 30 is unseated as shown in FIG. 2. At this point it should be noted that the U-cup seal 54 does not allow the high pressure control signal to affect the air pressure in the pulse chamber 36. The high pressure fluid in the main chamber 25 expands into the pulse chamber 36, and the pressure in the main chamber drops. The drop in pressure permits the high pressure under the diaphragm 22 to lift the main valve member 23 (see FIG. 2) and high pressure fluid is supplied to the outlet port 19. Simultaneously, the high pressure fluid from the inlet port 18 flows through hole 26 into the main chamber 25 and, via bores 34, and 35, into the pulse chamber 36. Eventually, the pressure in the chambers 25 and 36 builds up and in combination with the force exerted by the spring 27 seats the main valve 22 (see FIG. 3), thereby terminating the flow of high pressure fluid to the outlet port 19. At this stage of the operation of the valve, it should be noted that the continued open condition of the pilot valve member 30 does not cause additional pulses of fluid to be transmitted to the output port 19 because the high pressure in the pulse chamber 36 does not allow the fluid in the main chamber 25 to escape as previously described.

To reset the valve for another cycle, the control signal must be removed from hole 50, thereby allowing spring 27 to close the pilot valve and the fluid in the pulse chamber 36 to vent through the bore 40, piston cylinder 38, and hole 50. As the pressure applied leaves the pulse chamber 36, the pressure in the pulse chamber drops to its initial low value and the valve is ready for another cycle of operation. When the valve is reset, its components are again positioned as shown in FIG. 1.

From the operation of the valve described, it may be noted that the operation of the valve provides a pressure pulse for a fixed period of time which is dependent upon the volume of the pulse chamber and the pressure of the signal applied to the input port. The maximum frequency at which the fixed pressure pulses may be provided is dependent upon the time required to vent the pulse chamber.

Figure 3:
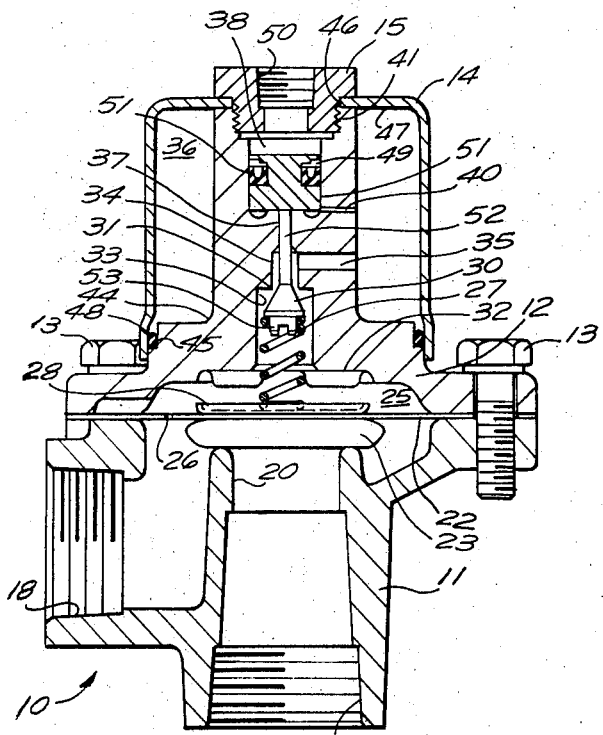
FIG. 3 is a longitudinal cross-sectional view of the pneumatic valve showing the pilot valve open and the main valve closed.
Figure 4:
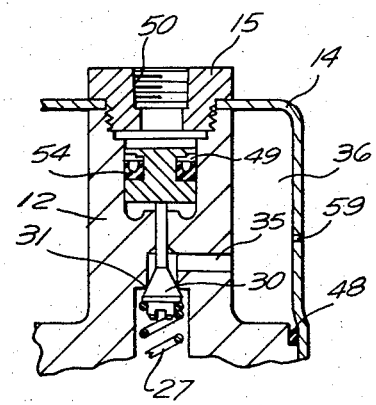
FIG. 4 is a fragmentary cross-sectional view of the pneumatic valve, the valve being modified to vent to the atmosphere.

Although in the embodiment described above, the pulse chamber 36 is vented through the bore 40, piston cylinder 38, and hole 50, it should be noted that in valves used in low pressure environments the pulse chamber 36 may be vented, additionally or alternatively, via a hole 59 (see FIG. 4) in the auxiliary chamber 14. In such a case, hole 59 will obviously be smaller than hole 26 so that the pressure in pulse chamber 36 can rise to the inlet pressure when the pilot valve is open. One disadvantage of the embodiment of FIG. 4 however, with respect to that of FIGS. 1-3, is that it involves a continuous bleed of fluid out of hole 59. In contrast, fluid bleeds out of the pulse chamber of the FIGS. 1-3 embodiment only when the control signal is removed from hole 50, and the amount of fluid which bleeds out is limited by the capacity of pulse chamber 36.

Further, although the piston 51 actuated by a fluid pressure control signal, has been described as the pilot valve operator, the pilot valve may be actuated by an electromechanical actuator such as a solenoid or by some other type of operator without impairing the ability of the valve to supply a single fixed output pressure pulse in response to each fluid, electrical, or other type of control signal.

Accordingly, it is to be understood that the description herein of a preferred embodiment according to the invention is set forth as an example thereof and is not to be construed or interpreted as a limitation on the claims which follow and define the invention.

What is claimed is:

1. A valve comprising:
   a. a valve body having an inlet port, an outlet port, and an orifice between said ports surrounded by a valve seat;
   b. a main valve member movable into and out of engagement with said valve seat to close and open the valve, respectively;
   c. a main chamber on the side of said valve member opposite said valve seat, said main chamber communicating with said inlet port, whereby inlet pressure applied to said opposite side of said valve member keeps the valve closed;

d. a pulse chamber;

e. a pilot valve for selectively permitting or preventing communication between the main chamber and the pulse chamber; and f. vent means through which high pressure fluid in said pulse chamber can leave said pulse chamber to lower the pressure in the latter whenever said pilot valve prevents communication between said main chamber and pulse chamber, so that reduction of pressure in said pulse chamber begins immediately upon the closing of said pilot valve, said vent means being structured to permit a lower rate of flow out of said pulse chamber than the rate of fluid flow into said pulse chamber when said pilot valve is open, so that pressure builds up in said pulse chamber and remains built up as long as said pilot valve remains open.

2. A valve as defined in claim 1 wherein the pilot valve includes a pilot valve seat between said main chamber and said pulse chamber; a pilot valve member adapted to mate with the pilot valve seat; and means for selectively seating and unseating said pilot valve member in the pilot valve seat.

3. A valve as defined in claim 2 wherein said means for seating and unseating said pilot valve member includes resilient means urging said pilot toward said pilot valve seat, said resilient means also serving to urge said main valve member toward its valve seat.

4. A valve as defined in claim 2 wherein said means for seating and unseating said pilot valve member includes an operator responsive to receipt of a control signal for unseating said pilot valve member.

5. A valve as defined in claim 4 wherein said operator includes a cylinder, and a piston movable in said cylinder in response to a fluid pressure signal, and including means for transmitting movement of said piston to said pilot valve.

6. A valve as defined in claim 5 wherein said vent means is arranged between said pulse chamber and said cylinder.

7. A valve as defined in claim 6 including a signal port communicating with the face of said piston opposite the pilot valve member, and a seal between said piston and cylinder, said seal permitting fluid flow past it only in a direction from said vent toward said signal port but not in the opposite direction.

8. A valve as defined in claim 1 including means for operating said pilot valve in response to a fluid pressure signal, and a port at which the fluid pressure signal is intermittently applied, and wherein said vent means is arranged between said pulse chamber and said port, whereby when no signal is applied to said port the fluid in said pulse chamber can leave said pulse chamber through said vent means and port.

9. A valve as defined in claim 1 wherein said vent means is arranged to continuously bleed fluid from said pulse chamber to the surroundings, the size of said vent means being smaller than the size of the smallest communication between said inlet port and said pulse chamber.

* * * * *